United States Patent [19]
Rensel

[11] Patent Number: 6,036,179
[45] Date of Patent: Mar. 14, 2000

[54] AIR SPRING CONTAINING AN ACTIVE DEVICE AND A SUSPENSION ASSEMBLY AND METHOD USING

[75] Inventor: John D. Rensel, Tallmadge, Ohio

[73] Assignee: Bridgestone/Firestone, Inc., Akron, Ohio

[21] Appl. No.: 08/996,418

[22] Filed: Dec. 22, 1997

[51] Int. Cl.[7] .................................................. B60G 11/26
[52] U.S. Cl. .................................... 267/64.11; 188/1.11 R; 267/64.27; 267/64.28; 340/447; 152/152.1
[58] Field of Search .............................. 267/64.11, 64.28, 267/DIG. 1, 64.19, DIG. 2, 64.21, 64.24, 64.23, 64.27, 122; 701/37, 38, 29, 30, 35, 45; 340/825.54, 447, 442; 280/5.514, 6.157, DIG. 1; 73/11.07, 146.5, 146, 146.2, 146.8, 862.581, 632, 658; 152/415, 416, 152.1; 141/38; 303/191; 188/1.11 R, 1, 11 E; 116/34 R, 28 R; 200/61.25; 702/41, 138; 177/2, 1, 136, 137, 25.12

[56] References Cited

U.S. PATENT DOCUMENTS

| | | | |
|---|---|---|---|
| 3,833,094 | 9/1974 | Grossman | 188/1 A |
| 4,386,791 | 6/1983 | Watanabe | 280/707 |
| 4,398,704 | 8/1983 | Buchanan, Jr. et al. | 267/64.21 |
| 4,678,203 | 7/1987 | Röhner et al. | 267/64.28 |
| 4,695,823 | 9/1987 | Vernon | 73/146.8 |
| 4,798,369 | 1/1989 | Geno et al. | 267/64.11 |
| 4,817,922 | 4/1989 | Hovance | 267/64.21 |
| 5,500,065 | 3/1996 | Koch et al. | 156/123 |
| 5,535,630 | 7/1996 | Miyamoto | 73/778 |
| 5,552,789 | 9/1996 | Schuermann | 342/42 |
| 5,562,787 | 10/1996 | Koch et al. | 156/64 |
| 5,573,610 | 11/1996 | Koch et al. | 152/152.1 |
| 5,573,611 | 11/1996 | Koch et al. | 152/152.1 |
| 5,707,045 | 1/1998 | Easter | 267/64.28 |

*Primary Examiner*—Douglas C. Butler
*Attorney, Agent, or Firm*—John M. Vasuta; Michael Sand

[57] ABSTRACT

An air spring has a pair of spaced end members and a fluid pressure chamber therebetween formed by an elastomeric flexible sleeve. The air spring is adapted to be mounted on a vehicle suspension system in close vicinity to one of the vehicle tires. The air spring and the vehicle tires each includes a monitoring device for sensing an engineering condition of the air spring and/or tire. The tire monitoring device transmits the sensed engineering condition of the tire to the air spring monitoring device which retransmits to received tire data and the collected air spring engineering condition data to a distance location with less power and more efficient signal than possible if transmitted directly by the monitoring device of the tire due to the reduced wall thickness of the sleeve of the air spring in contrast to the sidewall thickness of the tire. Both the air spring and tire may contain stored ID information pertaining to the particular air spring and tire in which they are contained, which information also can be transmitted by the air spring device to a remote location. A height sensor may be contained within the air spring and coupled with the air spring transmitting device to provide additional operating information to an interrogator at a remote location.

15 Claims, 4 Drawing Sheets

6,036,179

AIR SPRING CONTAINING AN ACTIVE DEVICE AND A SUSPENSION ASSEMBLY AND METHOD USING

BACKGROUND OF THE INVENTION

TECHNICAL FIELD

The invention relates to vehicle suspensions and particularly to an air spring having a device for monitoring various physical conditions of the air spring and to use of the air spring in combination with an internal height sensor. More particularly, the invention relates to a suspension system utilizing the air spring in combination with a tire having a memory device containing stored information relating to the tire and sensors for sensing engineering conditions of the tire which information is transmitted to the monitoring device within the air spring for subsequent retransmission to a remote location wherein the air spring can track the service history of the air spring such as its load, pressure and temperature and increases the transmission efficiency of the data from the tire by retransmitting it through the thinner sidewalls of the air spring to the remote location.

BACKGROUND INFORMATION

It is desirable to monitor the condition of tires as to wear, internal temperature and internal pressure. It is particularly advantageous to monitor large truck tires since these are expensive and must be regularly maintained to maximize vehicle efficiency. In the past, such monitoring activities have generally used a passive integrated circuit embedded within the body of the tire and activated by a radio frequency transmission which energizes the circuit by inductive magnetic coupling. Passive devices which rely on inductive magnetic coupling or capacitive coupling generally have the disadvantage of requiring lengthy coil windings, thus requiring major modifications in the tire construction and assembly process. Another serious disadvantage with such passive devices is that the interrogator must be positioned in very close proximity to the tire, usually within a few inches of the tire, in order to allow communication between the tire and the device. Because of the proximity requirements, continuous monitoring is impractical since it would require that an interrogator be mounted at each wheel of the vehicle. Manual acquisition of data from the passive devices embedded in each of the tires of a parked vehicle is also cumbersome and time consuming because of the proximity requirements.

Other prior art devices used for monitoring tire conditions have comprised self-powered circuits which are positioned external of the tire, such as at the valve stem. Externally mounted devices have the disadvantage of being exposed to damage, such as from weather and vandalism. Another disadvantage with installing devices external of the tire is that the device itself introduces additional sealed joints from which air may leak. Additionally, externally installed devices can easily become disassociated from a particular tire which is being monitored.

Another disadvantage with known tire monitoring and identification devices is that communication transmissions preferably are achieved using conventional radio frequencies (RF) which generally require a relatively large antenna which must be mounted externally or secured to the tire in such a manner which requires relatively major modifications in the tire construction or assembly process.

Many of these problems have been eliminated by the method and tire construction shown and described in U.S. Pat. Nos. 5,500,065; 5,562,787; 5,573,610 and 5,573,611. However, these devices are contained within the tire-wheel chamber and have difficulty transmitting data through the tire to external receivers. Most importantly, when using RF frequency communication difficulties are encountered in transmitting the signals to a remote distant location due to the signals being required to pass through the tire sidewall, which due to its thickness in truck tires, materially reduces the transmission efficiency thereof. Tests have shown that there is approximately 15 dB signal loss when the signal is transmitted through the relatively thick sidewalls of the truck tires. This increases the size of the battery required for transmission and increases the cost of the tire tag.

Also, it is desirable for certain air spring applications where tracking and performance specifications are critical that some type of monitoring system be provided. There is no known means of easily monitoring the conditions of an air spring, such as its load, temperature, pressure etc. and to maintain a service history of the air spring. Likewise, although prior art air springs have used internal height sensors for controlling the pressure within the air spring and for providing an indication of a load and pressure thereon, this is usually achieved through a hard wire system extending between the height sensor and the air spring compressor.

Likewise, although the method and tire monitoring devices shown and described in the above four mentioned patents provide many advantages over the prior art, it is desirable to provide for a tire monitoring system which provides greater versatility and flexibility by improving external RF communication transmission in terms of signal/ noise ratio, reproducibility and distance by coupling the output of the tire monitoring system to a monitoring device contained within a closely adjacent air spring which is able to receive the signals from the tire monitoring device and retransmit the same to a greater distance with less signal loss together with the transmission of sensed conditions in the air spring itself to a distant interrogator to monitor both the vehicle tires and air springs; i.e., the vehicle suspension, in a more efficient manner than heretofore possible.

SUMMARY OF THE INVENTION

In accordance with one aspect of the invention, an air spring is provided with an activatable memory device and monitoring or sensing device which contains stored data pertaining to the air spring and which can be coupled to a height sensor mounted within or external to the air spring to transmit signals generated by the air spring and height sensors to a remote interrogator.

A further objective of the invention is to provide such an air spring for use in a vehicle suspension system which is located closely adjacent a vehicle tire containing a tire tag, that is, a device having stored data pertaining to the tire and a monitoring or sensing device which senses engineering conditions within the tire such as load, pressure and temperature and transmits the information to the monitoring device within the adjacent air spring for subsequent retransmission by the air spring to a remote interrogator, wherein the interrogator can be a handheld unit, a vehicle cab mounted unit, a fixed gate interrogator etc.

A still further objective is to provide such an air spring and vehicle suspension system and associated method which adds memory and identification capability to the air spring for automotive and non-automotive applications and which couples the output of an internal or external height sensor to the remote interrogator by use of radio frequency (RF), and in which the monitoring device of the air spring can be located either within the pressure chamber or exterior thereto by mounting it on either the inside or outside surface of one of the end plates of the air spring.

Another objective of the invention is to provide a suspension system for a vehicle having monitoring devices for the tires and air springs which provide increased signal strength by reducing signal strength loss by transmitting the signal through the thick sidewalls of the tires for only a short distance to the adjacent air spring and then retransmitting the signals a longer distance through the thinner air spring sidewalls or even externally of the air spring, without requiring passage through the sidewalls.

These objectives and advantages are obtained by the improved air spring of the present invention, the general nature of which may be stated as including an end plate and a piston member located in a generally axial spaced relationship when in an at rest position, said end plate and piston member being adapted to be mounted on spaced portions of an apparatus and movable towards and away from each other upon said apparatus encountering shocks to absorb said shocks and to maintain said spaced portions of the apparatus at a predetermined spaced relationship when in said at rest position; a fluid pressure chamber formed between said end plate and piston member by a flexible elastomeric sleeve having opposed open ends sealingly connected to said end plate and piston member; height sensing means mounted on one of the end plate and piston member for determining changes in the axial separation of said end plate and piston member and for generating a control signal in response to said changes; and a monitoring device in fluid communication with the fluid pressure chamber including a battery, at least one sensor for sensing an engineering condition of the air spring, and electronic circuit means for transmitting the sensed condition and the control signal from the height sensing means to a remote location external of the air spring.

These objectives and advantages are further obtained by the improved method of the invention, the general nature of which may be stated as including the steps of providing the air spring with a first device which provides for the collection of data pertaining to the air spring and which contains a first power source and first electronic circuitry for transmitting the collected data; securing the first device to an end plate of the air spring; sensing an engineering condition of the air spring; and activating the power source and electronic circuitry and transmitting the data from the air spring to a remote location.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
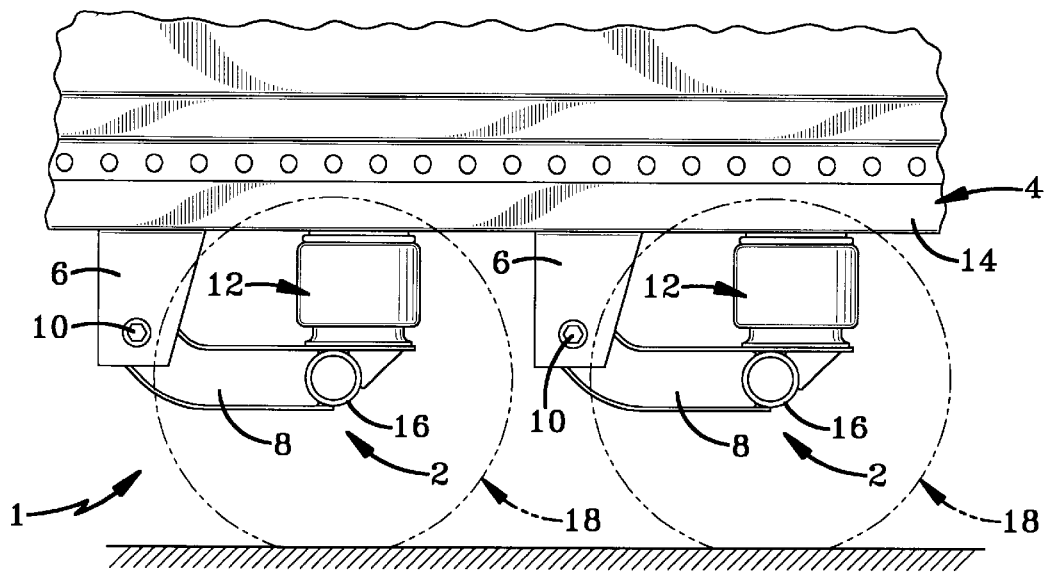
FIG. 1 is a fragmentary diagrammatic side elevational view of a vehicle suspension assembly utilizing the radio frequency active air spring of the present invention.
Figure 2:
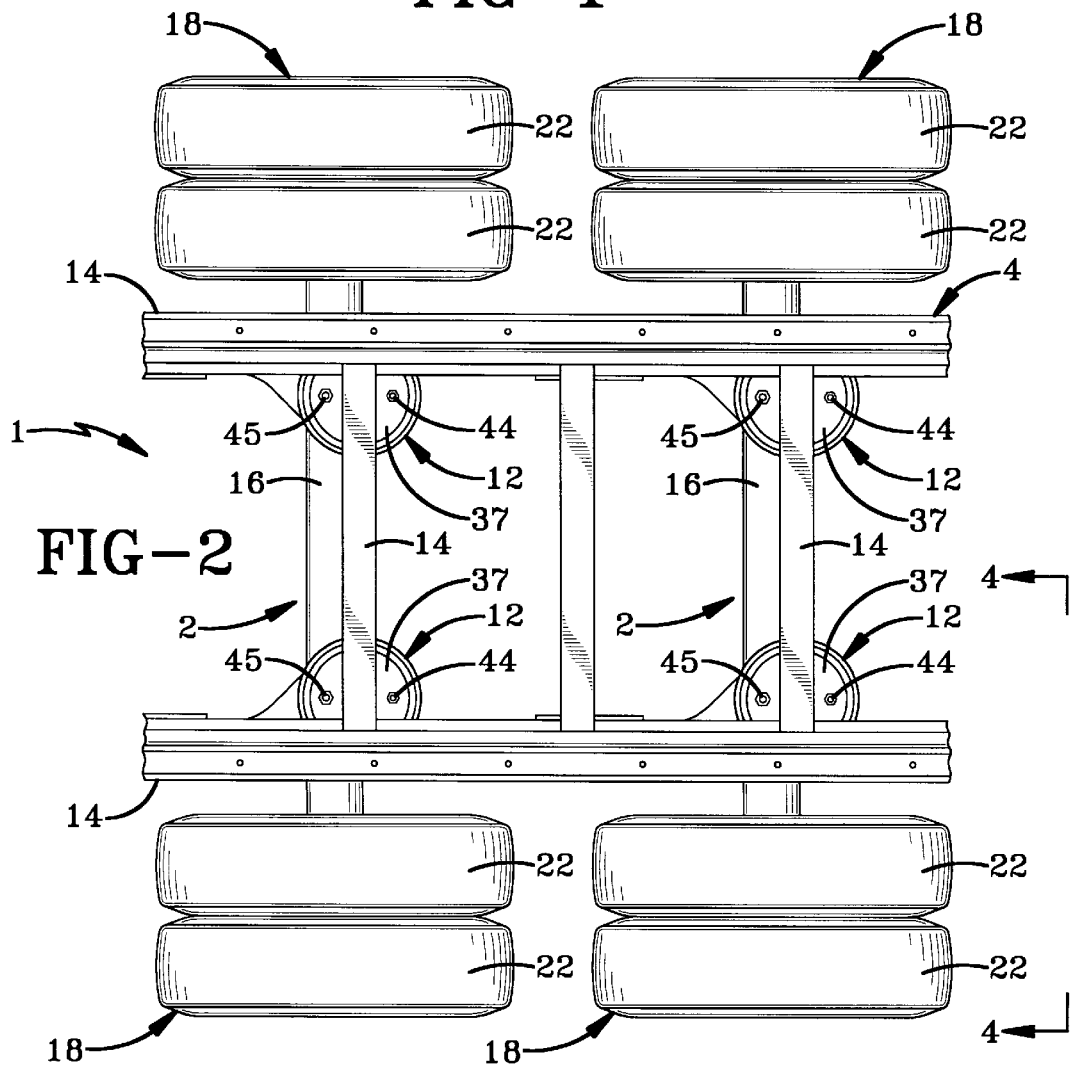
FIG. 2 is a fragmentary diagrammatic top plan view of the suspension assembly of FIG. 1.

The vehicle suspension assembly of the present invention is indicated generally at 1, and is shown diagrammatically in FIGS. 1 and 2. Suspension assembly 1 includes a pair of axle assemblies 2 which are mounted beneath a vehicle frame 4 by a pair of downwardly extending hanger brackets 6 to which are attached trailing arms 8 by pivotal connections 10. The improved air spring of the present invention is indicated generally at 12, and extends between the outer end of each trailing arm 8 and one of the main horizontal support beams 14 which form a part of frame 4.

Figure 4:
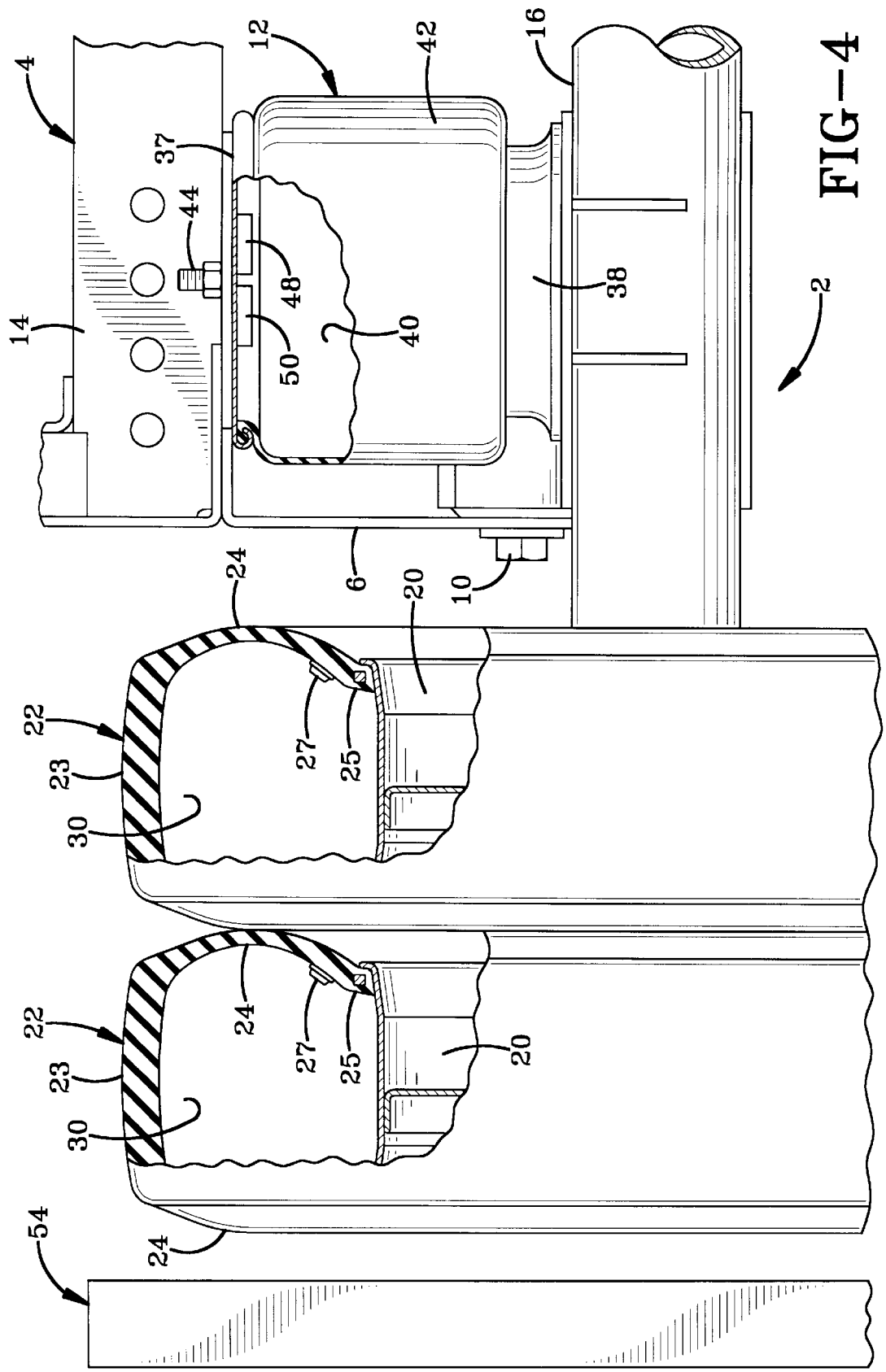
FIG. 4 is an enlarged fragmentary view with portions broken away and in section, showing a portion of the suspension assembly of FIGS. 1 and 2.

Each axle assembly 2 includes an axle 16 which extends between and is connected to a pair of spaced trailing arms 8. In many heavy-duty truck and trailer applications, a pair of wheels 18 are mounted on each end of each axle 16, each of which includes a usual rim 20 and a pneumatic tire 22 (FIG. 4). Each tire 22 includes a usual tread package 23, sidewalls 24 and bead areas 25 which mount the tire on the rim. Preferably, each of the tires 22 includes a tire tag 27 which is mounted on the innerliner of the tire in the vicinity of bead area 25. Tire tag 27 preferably is similar to those discussed in the previous mentioned four U.S. Pat. Nos. 5,500,065; 5,562,787; 5,573,610 and 5,573,611, the contents of which are incorporated herein by reference.

Figure 5:
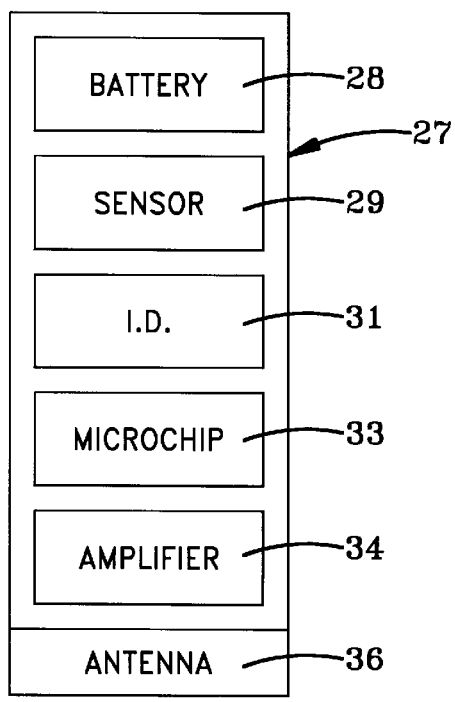
FIG. 5 is a block diagram representative of the various components contained in the radio frequency active tag assembly of the vehicle tire and of the air spring located adjacent an external interrogator.

A preferred construction of tire tag 27 is shown in block diagram form in FIG. 5 and preferably will include a power source such as a battery 28, one or more sensors 29 which are in fluid communication with the pressurizable cavity 30 of tire 22, and will contain stored data and in particular stored ID indicated at 31, which is customized to the particular tire 22 in which the tire tag is mounted. Tire tag 27 furthermore may include a microchip 33 and an amplifier 34, which together form electronic circuit means preferably operating at radio frequencies (RF), for transmitting signals and collected data by an antenna 36. The particular details and examples of such components are set forth in the above four mentioned patents and thus are not set forth in further detail.

The operation of tire tag 27 is also discussed in detail in the four above mentioned patents and is adapted to transmit engineering data collected by sensor 29 along with particular ID information relating to the tire contained in stored data 31 to a remote location through the electronic circuitry of microchip 33, amplifier 34 and antenna 36. As indicated previously, although tire tag 27 or variations thereof, do provide certain desired results it has the disadvantage of a reduced transmission distance requiring a larger battery than desired in order for the RF signals to pass through the relatively thick sidewalls of a usual heavy-duty truck tire 22.

Figure 3:
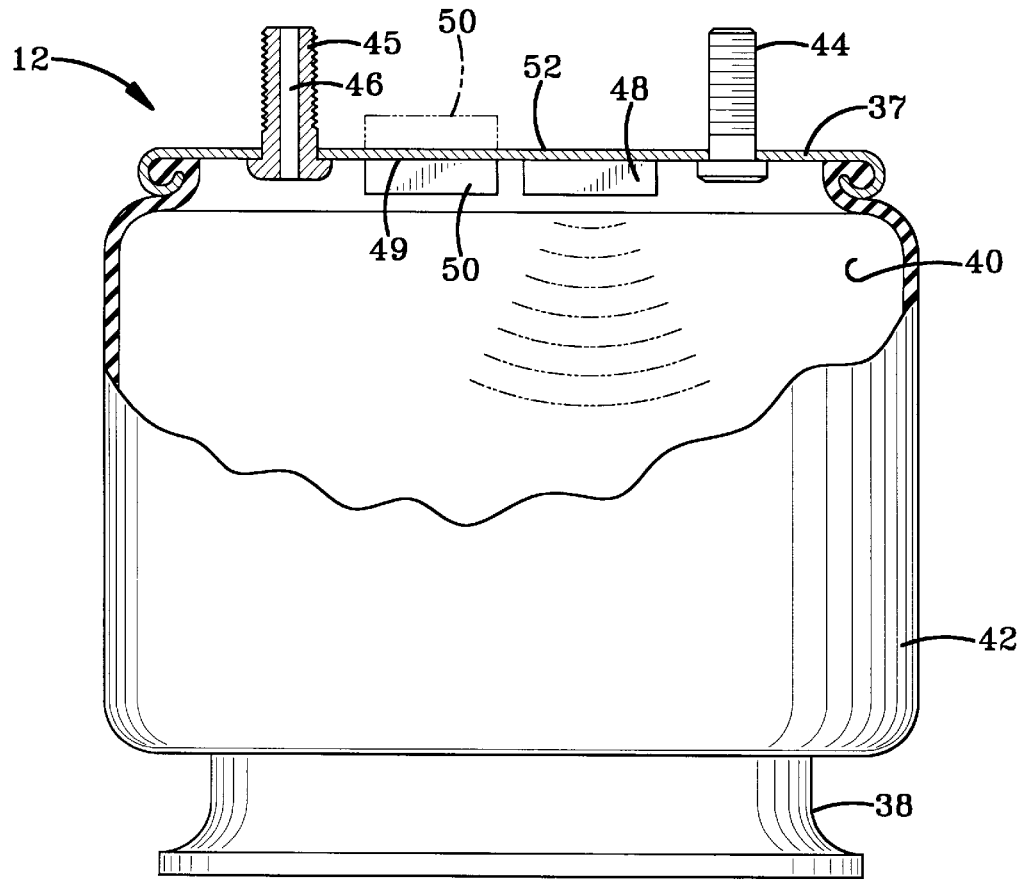
FIG. 3 is an enlarged side elevational view with portions broken away and in section, of the improved air spring utilizing the radio frequency active tag assembly and height sensor therein.

Air spring 12 is shown in detail in FIG. 3 and is of a usual construction is that it includes a pair of spaced end members 37 and 38, which in the particular embodiment shown consists of an upper end plate 37 and a lower piston 38. A fluid pressure chamber 40 is formed within a flexible elastomeric sleeve 42, which will have spaced open ends that are in sealed engagement with end plate 37 and piston 38 to form chamber 40. Air spring 12 is adapted to be mounted to support beams 14 by a plurality of solid threaded mounting bolts 44, only one of which is shown in FIG. 3, and a threaded stud 45 having a thru bore 46 formed therein. Stud 45 is adapted to be connected to a remote compressor by a fluid supply line (not shown) for controlling the amount of fluid in chamber 40 depending upon the load and displacement on air spring 12.

A height sensor 48 is mounted on inside surface 49 of end plate 37 and senses the axial separation occurring between end plate 37 and piston 38 as the two end members move toward and away from each other as the vehicle experiences road perturbations and vehicle loading. One type of height sensor 48 is an ultrasonic sensor as shown in U.S. Pat. No. 4,798,369. However, it could be other types such as ultrasonic, infrared, etc. without affecting the concept and advantages achieved by the present invention. In prior art air springs, sensor 48 provides a signal to a remote location, such as a vehicle compressor, usually through a hard wired system, which then regulates the fluid pressure within chamber 40 through stud bore 46.

In accordance with one of the features of the invention, a monitoring and data storage device indicated generally at 50, is mounted on the air spring, preferably on end plate 37. Device 50 may be mounted on inside surface 49 as shown in solid lines in FIG. 3, or may be mounted on the outer surface 52 as shown by dot-dash lines in FIG. 3. When mounted on inside surface 49, device 50 is less susceptible to damage caused by the harsh environment to which it will be exposed if mounted on outer surface 52. However, when mounted on outer surface 52, device 50 is easily changed and repaired since it does not require any disassembly of the elastomeric sleeve 42. Also, it will transmit the various signals as discussed further below, without the signal being required to pass through sleeve 42 thereby providing an enhanced and more efficient signal with less power than if mounted within the pressure chamber. However, either location interior or exterior of chamber 40, has certain advantages and its exact location will depend upon the particular application with which it will be used.

Device 50 can be very similar to tire tag 27 shown in FIG. 5 and discussed above, and preferably includes the same components or similar components as tire tag 27, that is, a sensor 29 for sensing various engineering conditions occurring within the air spring, such as pressure, temperature, etc. and can also contain stored ID information 31 pertaining to the particular air spring, per se. Also, it will contain an electronic circuit 33–34 and antenna 36 for transmitting the stored data and sensed engineering conditions to a remote location by a battery 28.

Thus, in accordance with one of the features of the invention, air spring 12 contains a monitoring and data storage device which enables the service history of a particular air spring such as its pressure, temperature, etc. to be tracked for those applications where performance specifications of the air spring are critical. Device 50 may or may not be coupled with height sensor 48 and for certain applications, use of device 50 alone will provide increased reliability and monitoring of the air spring. Heretofore, there is no known air spring used primarily for vehicles including trucks, automobiles, etc. or for other applications, which have memory and identification capability before the development of air spring 12 described above.

Figure 6:
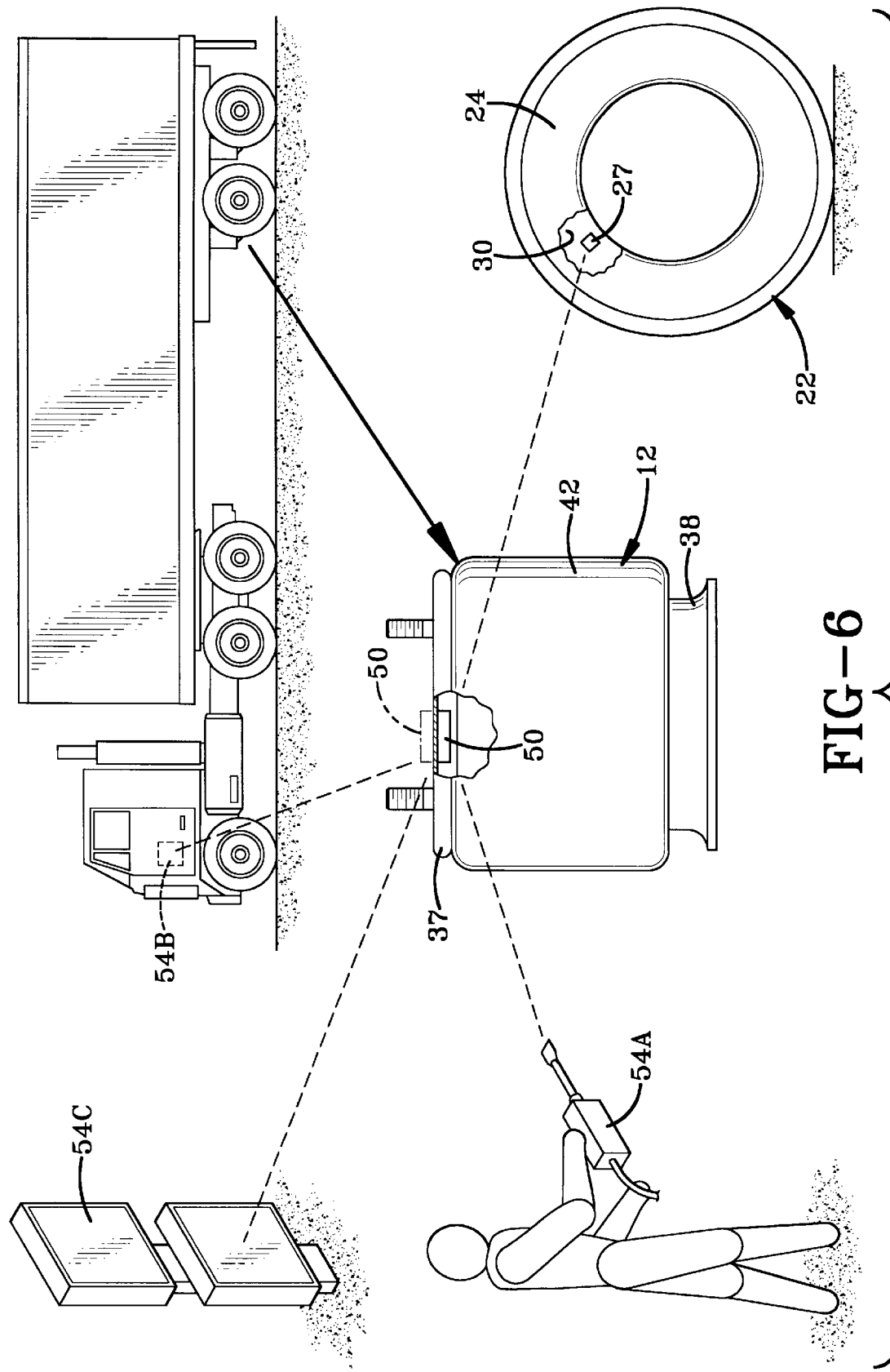
FIG. 6 is a diagrammatic view of how the air spring active tag assembly can transmit information to various types of remote interrogators.

In further accordance with the invention, height sensor 48 may be coupled with monitor and storage device 50 whereby the circuitry and power source of device 50 may be used to transmit the information gathered by height sensor 48 alone or in combination with the collected data in device 50, to a remote location such as various types of interrogators, collectively indicated as 54, as shown in FIGS. 4 and 6. For other applications, the collected data will be transmitted to an interrogator located on the particular vehicle on which the air spring and tires are mounted, which usually is located in the cab of the vehicle, to provide audio or visual indication to the driver of certain conditions existing in the tire and/or air spring, especially if certain critical limits are exceeded by either.

Another important feature of this unique suspension assembly is best illustrated in FIG. 4. FIG. 4 shows a usual arrangement of many heavy-duty trucks wherein a pair of tires 22 are mounted on each end of the axle which is supported partially on the vehicle by an air spring 12. Many of these heavy-duty trucks will contain a tire tag 27 within the tire for monitoring the engineering conditions which the tire experiences, such as pressure and temperature which heretofore was transmitted by various devices and arrangements directly to a remote interrogator such as gate interrogator 54C which could be located at a freight terminal, government weigh station or other station which will read the information from tire tag 27 as the vehicle stops adjacent thereto. Alternatively, the information from tire tag 27 will be fed to an interrogator 54B located within the cab of the vehicle. Likewise, a Department of Transportation (DOT) vehicle could obtain the collected information by a handheld or vehicle mounted interrogator as it drives along side a moving truck.

In accordance with the invention, air spring 12 which is located in a close vicinity to at least one of the tires 22, will now receive the signals transmitted from each tire tag 27. Device 50 will collect the sensed data transmitted by the tire tag which will then be retransmitted by the device to an interrogator located at a remote location. FIG. 6 shows diagrammatically how air spring 12 and in particular device 50, can transmit data to various remote interrogators such as a handheld unit 54A, a cab mounted interrogator 54B, and a stationary gate interrogator 54C as example, and how it receives data from or transmits data to tire tag 27. These interrogators are well known in the art and thus are not described in further detail.

Heretofore, the signal strength of tire tags 27 was reduced considerably by the signal having to pass through the relatively thick sidewalls 24 of the tire thereby limiting its range of transmission and requiring an increase in size of the power source for transmitting the signals to an interrogator located at a considerable distance. However, the signal generated by monitor and data storage device 50, whether located internal or external of the air spring, has enhanced efficiency since even if located within the fluid pressure chamber of the air spring, more easily passes through the thin sidewalls of sleeve 42 without an appreciable loss in transmission efficiency and with considerable reduced power than required for passing the signal through the thick sidewalls of tires 22. Furthermore, device 50 can be coupled with height sensor 48 and provide still additional information to a remote interrogator, which in addition to monitoring the characteristics and operating conditions of the air spring per se, also is coupled electronically through the use of radio frequency (RF) signals to the individual tire tags in each of the vehicle tires.

Preferably, one air spring will be located adjacent one of the tires of each pair of tires and will contain the monitor/data storage device 50 therein, and due to its close proximity to the pair of tires will collect the tire data and transmit the same individually or together with the sensed air spring data to the remote location. Although the use of such an air spring containing the monitor/data storage device 50 will not be used for all vehicle applications, it will be used for those applications where tracking and performance specifications of the air spring and/or tire are critical.

It is readily understood that other components and component arrangements and circuitry could be used for tire tag 27 and device 50 than that shown in FIG. 5 without affecting the concept of the invention. The use of device 50 for transmitting all collected data to a remote interrogator enables tire tag 27 to be of a smaller size requiring a less powerful battery since the distance of transmission is relatively small thereby reducing its cost. Likewise, as indicated above, device 50 preferably is mounted on end plate 37, either within the pressure chamber or exterior thereof. If desired, device 50 can be mounted on piston 38 or a lower end plate without affecting the concept of the invention.

Accordingly, the improved method and apparatus is simplified, provides an effective, safe, inexpensive, and efficient device and method which achieves all the enumerated objectives, provides for eliminating difficulties encountered with prior devices and methods, and solves problems and obtains new results in the art.

In the foregoing description, certain terms have been used for brevity, clearness and understanding; but no unnecessary limitations are to be implied therefrom beyond the requirement of the prior art, because such terms are used for descriptive purpose and are intended to be broadly construed.

Moreover, the description and illustration of the invention is by way of example, and the scope of the invention is not limited to the exact details shown or described.

Having now described the features, discoveries and principles of the invention, the manner in which the improved apparatus and method is constructed and used, the characteristics of the construction, and the advantageous, new and useful results obtained, the new and useful structures, devices, elements, arrangements, parts and combinations, and method steps are set forth in the appended claims.

I claim:

1. An air spring including:

an end plate and a piston member located in a generally axial spaced relationship when in an at rest position, said end plate and piston member being adapted to be mounted on spaced portions of an apparatus and movable towards and away from each other upon said apparatus encountering shocks to absorb said shocks and to maintain said spaced portions of the apparatus at a predetermined spaced relationship when in said at rest position;

a fluid pressure chamber formed between said end plate and piston member by a flexible elastomeric sleeve having opposed open ends sealingly connected to said end plate and piston member;

height sensing means mounted on one of the end plate and piston member for determining changes in the axial separation of said end plate and piston member and for generating a control signal in response to said changes; and a monitoring device in fluid communication with the fluid pressure chamber including a battery, at least one sensor for sensing the fluid pressure within the air spring, and electronic circuit means for receiving the control signal from the height sensor and the sensed fluid pressure for determining the load on the air spring and for transmitting the load by wireless communication to a remote interrogator external of the air spring.

2. The air spring defined in claim 1 wherein the monitoring device and height sensing means each includes components mounted on the end plate within the pressure chamber.

3. The air spring defined in claim 1 wherein the monitoring device is mounted on the end plate exteriorly of the pressure chamber.

4. The air spring defined in claim 1 further including data storage means containing data pertaining to said sir spring and coupled with the monitoring device whereby said stored data can be transmitted by the electronic circuit means to the remote location.

5. The air spring defined in claim 1 wherein the control signal from the height sensing means generates air spring operating history data which is stored by the electronic circuit means for subsequent transmission by said circuit means to the remote location.

6. A suspension assembly for a vehicle including an axle, at least a pair of tires mounted on said axle and an air spring extending between spaced supports of said vehicle located in the close proximity to at least one of said tires; a first monitoring device mounted within a pressurizable cavity of the said one tire for sensing information pertaining to said one tire; said air spring having a pair of spaced end member and a pressure chamber formed between said members by a flexible elastomeric sleeve; and first means mounted on the air spring for receiving the information sensed by the first monitoring device and for transmitting said information to a location remote from and exterior of the said tire and air spring.

7. The assembly defined in claim 6 wherein the first means of the air spring includes a second monitoring device in communication with the pressure chamber of the air spring for sensing information pertaining to said air spring; and in which said first means transmits the sensed information of the air spring to a remote location.

8. The assembly defined in claim 7 including first data storage means mounted within the pressurizable cavity of the said one tire for containing data pertaining to said one tire.

9. The assembly defined in claim 7 wherein each of the first and second monitoring devices contains a battery, an antenna, a sensor and an electronic circuit for transmitting the sensed information.

10. The assembly defined in claim 7 wherein the second monitoring device is mounted on one of the end members of the aid spring within the pressure chamber.

11. A method of transmitting collected data from an air spring to a remote location including the steps of:

providing the air spring with a first device which provides for the collection of data pertaining to the air spring and which contains a first power source and first electronic circuitry for transmitting the collected data;

securing the first device to an end plate of the air spring;

sensing an engineering condition of the air spring;

activating the power source and electronic circuitry and transmitting the data from the air spring to a remote location;

mounting the air spring adjacent a vehicle tire containing a second device which senses an engineering condition of the tire;

transmitting the sensed engineering condition of the tire to the first device within the air spring; and retransmitting the sensed tire engineering condition to the remote location by the said first device.

12. The method defined in claim 11 including the step of providing the second device with a second power source, an antenna and second electronic circuitry for transmitting the sensed data to the first device.

13. The method defined in claim 11 including the step of providing the air spring with a height sensor; coupling the height sensor with the first device; and transmitting data from said height sensor to the first device.

14. The method defined in claim 11 including the step of mounting the first device on an interior surface of the end plate of the air spring within the pressure chamber.

15. The method defined in claim 11 including the step of mounting the first device on an exterior surface of the end plate of the air spring.

* * * * *